May 25, 1937. J. K. E. DIFFENDERFFER 2,081,580
TRANSFER MECHANISM
Filed April 6, 1935  3 Sheets-Sheet 2
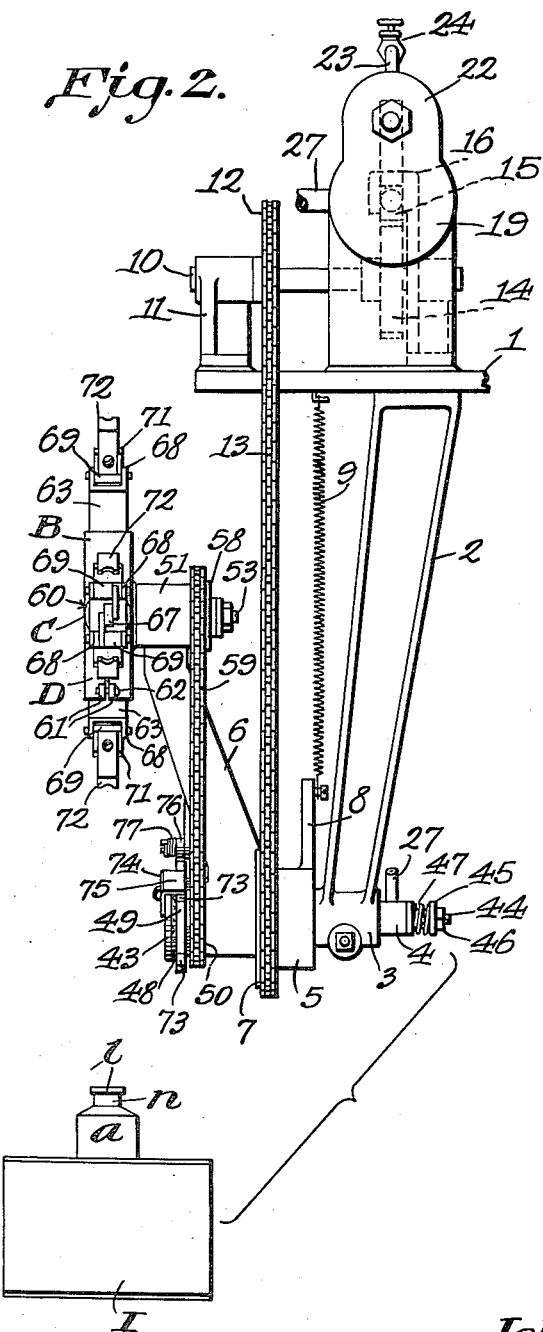
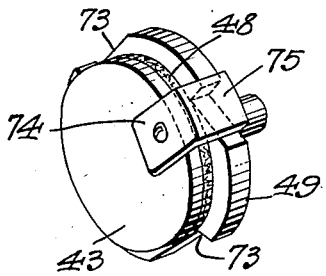
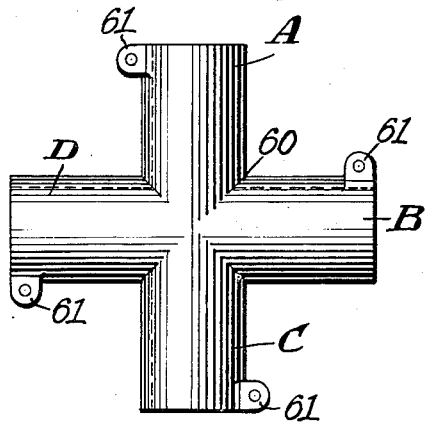
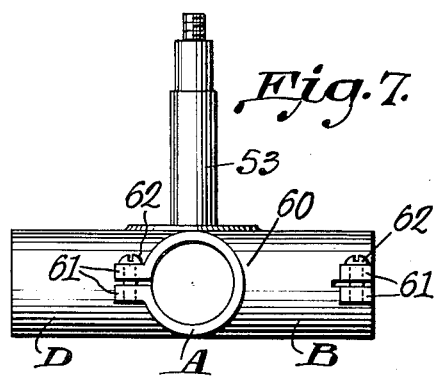
Inventor
John K. E. Diffenderffer
By C A Snow & Co.
Attorneys May 25, 1937.　　J. K. E. DIFFENDERFFER　　2,081,580
TRANSFER MECHANISM
Filed April 6, 1935　　3 Sheets-Sheet 3
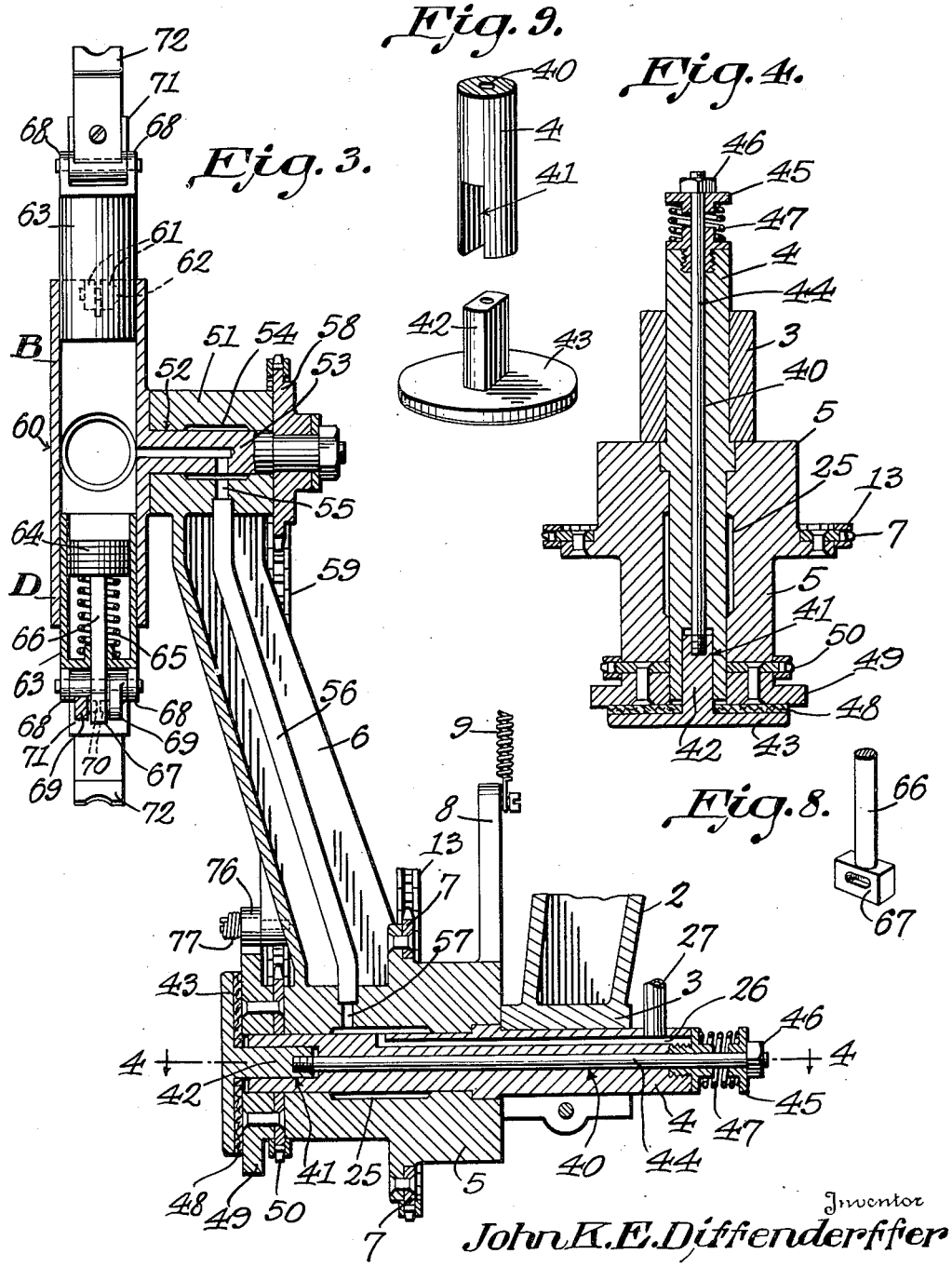
Inventor
John K. E. Diffenderffer
By C. A. Snow & Co.
Attorneys Patented May 25, 1937

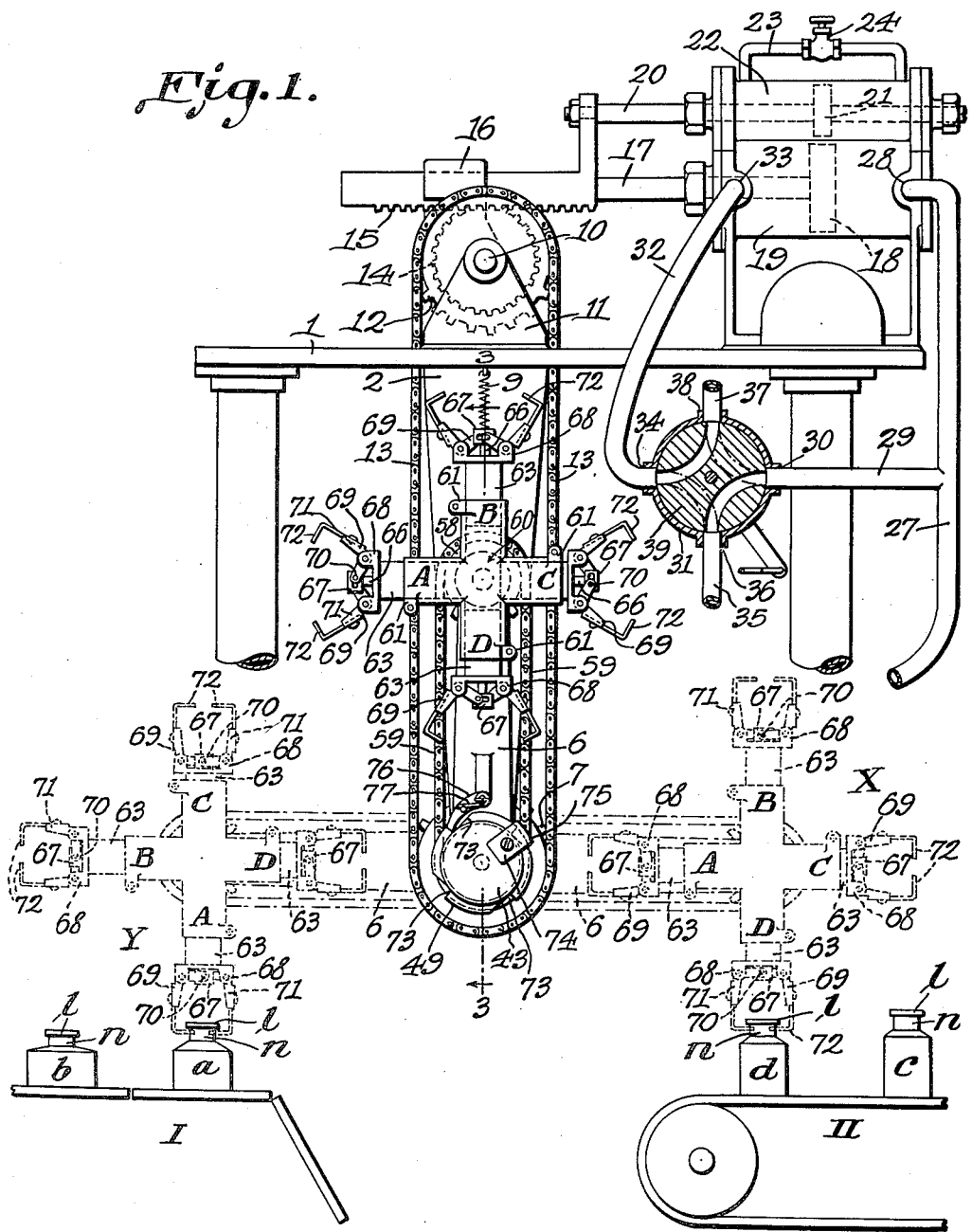

2,081,580

UNITED STATES PATENT OFFICE 2,081,580

TRANSFER MECHANISM

John K. E. Diffenderffer, Baltimore, Md., assignor to Hartford-Empire Company, Hartford, Conn., a corporation of Delaware Application April 6, 1935, Serial No. 15,118

24 Claims. (Cl. 214—1)

This invention relates to transfer mechanism designed primarily for use in connection with glass forming machines.

A machine of the class referred to is generally provided with several finishing molds to which blanks are supplied in succession. All of these finishing molds can be used for producing glass articles of the same shape or size, in which event the means for transferring the glass articles from the conveyor of the forming machine to the conveyor of an annealing lehr can be of ordinary construction. However should it be desired to produce articles of two or more different sizes on the same machine at the same time, the transfer of these articles to the lehr becomes a problem which has been difficult to solve. Patents have been granted for transfer mechanisms capable of carrying not more than two different sizes of articles from the forming machine to the conveyor of the lehr but as most forming machines are provided with at least four finishing molds, it has not heretofore been possible to use four different kinds of finishing molds in one machine and yet transfer the finished articles automatically and without injury from the finishing machine to the lehr conveyor. Furthermore in transfer mechanisms thus far used for the purpose of carrying finished articles from a glass forming machine to a lehr the operation of the transfer mechanism has been dependent upon contact with the article to be transferred and this has frequently resulted in distortion or scarring of the article by the transfer mechanism.

It is an object of the present invention to provide a simple form of transfer mechanism which can be positioned to carry finished glass articles from the forming machine to the conveyor of a lehr without requiring forcible contact with the articles to be removed and consequent scarring or distortion of the articles.

It is a further object of the invention to provide a transfer mechanism which can successively carry different articles of as many as four different heights from the forming machine to the lehr conveyor, the formed articles being picked up in proper succession and the transfer mechanism being automatically adaptable to the sizes of the articles as they are presented thereto.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a front elevation of transfer mechanism embodying the present invention, an intermediate position thereof being indicated by full lines while two extreme positions have been indicated by broken lines, the air controlling valve and its connections being shown more or less diagrammatically.

Figure 2 is a side elevation of the transfer mechanism.

Figure 3 is an enlarged section on line 3—3, Figure 1.

Figure 4 is a section on line 4—4, Figure 3.

Figure 5 is a perspective view of the ratchet member of the transfer mechanism.

Figure 6 is a front elevation of the rotary head of the transfer mechanism.

Figure 7 is a plan view thereof.

Figure 8 is a perspective view of one of the piston rods carried by the transfer head.

Figure 9 is a perspective view of the friction disk and the slotted end of the axle, the parts being separated.

Referring to the figures by characters of reference I designates a portion of the conveyor of a glass forming machine while II designates a portion of the conveyor of a lehr. The transfer mechanism constituting the present invention is adapted to be erected at a point adjacent to these two conveyors so that when it is properly placed and operated, it will pick up formed articles from the conveyor I and deposit them on carrier or conveyor II.

The transfer mechanism can be supported in any suitable manner. In the structure illustrated there has been provided a frame 1 with a hanger 2 fixedly attached thereto and provided at its lower end with a split sleeve 3 in which is secured a stationary axle 4 constituting the bearing for the hub 5 of a sweep or arm 6. A sprocket 7 is secured to the hub 5 and extending upwardly from the hub is a finger 8 joined by a balance spring 9 to the frame 1.

A shaft 10 is mounted in suitable bearings 11 on frame 1 and secured thereto is a sprocket 12 which may be of the same diameter as sprocket 7 and is joined thereto by an endless chain 13. A gear 14 is also secured to shaft 10 and is in constant mesh with a rack 15 mounted to slide in a guide 16. This rack is joined to the rod 17 of a piston 18 mounted for reciprocation in a cylinder 19 and it is preferred to also connect the rack 15 to the rod 20 of a piston 21 mounted for reciprocation in another cylinder 22. This last cylinder has a bypass 23 provided with a regulating valve 24 and it is intended to fill cylinder 22 with oil adapted to circulate back and forth through the bypass 23 so as to control the speed of operation of piston 18. The speed of movement will be regulated by means of valve 24.

Formed within the hub 5 and extending around the axle 4 is an annular air chamber 25 in communication with a longitudinal passage 26 within the axle. The passage 26 is joined by a pipe 27 to a port 28 at one end of cylinder 19. Pipe 27 is also connected by a pipe 29 to one port 30 of a valve casing 31. Another pipe 32 extends from a port 33 at the other end of cylinder 19 to a port 34 in casing 31. An air supply pipe 35 opens into the casing 31 through a port 36 and an exhaust pipe 37 extends from a port 38 in the casing 31. A valve 39 is mounted for rotation in casing 31 and when it is in one extreme position it establishes communication between pipes 35 and 29 and between pipes 32 and 37. This has been shown by full lines in Figure 1. When the valve is moved to its other extreme position the pipes 35 and 32 are placed in communication while pipe 29 is placed in communication with the exhaust pipe 37. This position has been shown by dotted lines in said figure. It is to be understood that any other valve mechanism can be used in lieu of that shown should it be found desirable.

A central longitudinal bore 40 is formed in the axle 4 and is provided at one end with a slot or fork 41 in which is seated a stem 42 projecting from the center of a disk 43. To this stem is secured a rod 44 which extends through the bore 40 and through a washer 45, a head or nut 46 being secured to the right hand end of the rod 44 as seen in Fig. 3. A compression spring 47 is interposed between this washer and the axle 4 so as to exert a constant thrust against the washer 45 and, consequently, a constant pull through rod 44 upon the disk 43.

A friction disk 48 is carried by disk 43 and is held constantly pressed against the smooth outer side of a ratchet disk 49 to the inner side of which is secured a sprocket 50. Thus the friction disk 48 by bearing against ratchet disk 49 and clamping the sprocket 50 against the hub 5, will prevent the ratchet disk and the sprocket 50 from rotating freely.

The outer or free end of the sweep or arm 6 is formed with a hub 51 having a central bore 52 in which is journaled a stem 53. An air chamber 54 is formed in the hub 51 and extends around the stem, this air chamber being provided with a port 55 connected by a pipe 56 to a port 57 opening into the air chamber 25.

On one end of the stem 53 is fixedly secured a sprocket 58 joined by a chain 59 to the sprocket 50, the two sprockets being of the same diameter.

The other end of the stem 53 carries the transfer head 60 which, as shown particularly in Figure 6 is cruciform and made up of split tubular arms A, B, C and D. The split portion of each arm has a pair of ears 61 extending therefrom and engaged by a screw 62 whereby, by tightening the screw, the ears can be drawn toward each other and the split portion contracted.

Mounted in each of the arms of the transfer head is a cylinder 63 and this cylinder can be adjusted longitudinally in the arm so as to bring it to any desired position after which it can be securely held by contracting the split end of the arm of the head.

A piston 64 is slidably mounted in each cylinder 63 and is held normally pressed toward the inner end of the cylinder by a spring 65. A rod 66 extends from the piston through the outer end of its cylinder and has a transversely slotted head 67.

The outer end of each cylinder 63 carries opposed pairs of ears 68 and pivotally mounted between the ears of each pair is a bell crank 69. One arm of each bell crank is slidably and pivotally joined to the slotted head 67 adjacent thereto as shown at 70 while the other arm of each bell crank is provided with a finger 71 the free end of which carries a fork 72. Each pair of fingers 71 with their forks 72 constitute lifting tongs and when the bell cranks are in one position these forks 72 will be extended toward each other in the same plane and will provide a clearance sufficient to embrace the neck or other reduced portion $n$ of a bottle or other article so that the said forks cannot be lifted without coming against the pouring lip $l$ or other enlargement at the upper end of the article. These fingers are detachably connected to the bell cranks so that fingers of different lengths with forks of different sizes can be placed in position in pairs so as to be adapted to the particular article to be transferred by them. In the drawings some of the articles to be transferred have been indicated at $a$, $b$, $c$ and $d$, respectively.

The ratchet disk 49 heretofore referred to is formed in the present instance with four regularly spaced peripheral notches 73 and secured to the outer side of the disk 43 is a plate 74 having a laterally extended flat finger 75 of such length as to extend across the periphery of disk 49 and of such width as to cover any one of the notches 73 when brought to position thereover.

Pivoted to the sweep or arm 6 is a pawl 76 normally pressed by a spring 77 against the periphery of the ratchet disk 49 and this pawl is so arranged that when the sweep or arm 6 moves in a counterclockwise direction as seen in Figure 1 it will enter one of the notches 73 and thus forcibly rotate the ratchet disk.

Assuming that this transfer mechanism is to be used for conveying from one forming machine articles of four different heights produced successively by said machine, then one of the cylinders 63 is adjusted within the transfer head so that the forks 72 associated therewith can be brought into position to engage an article of one height at the proper point. It is to be understood of course that these forks 72 are to be so proportioned as to readily straddle the reduced portion $n$ of the article and at the same time exert a lifting action upon the lip portion $l$ thereof when the forks are raised. The next cylinder 63 is then adjusted in the same manner to adapt it to the height of the second article to be formed, and the third and fourth cylinders 63 are adjusted to adapt themselves to the third and fourth articles to be formed. In other words the parts carried by arm A will be adjusted to properly grip and elevate article $a$ while the parts carried by arms B, C and D will be adjusted to properly engage and lift articles $b$, $c$ and $d$ respectively.

Following the adjustment described the mechanism is ready for actuation and it is to be understood that any suitable means can be employed for directing air under pressure into pipe 35 while any other desired means can be used for shifting valve 39 automatically in timed relation to the glass forming machine.

Assuming that the transfer head is in its intermediate position as shown by full lines in Figure 1 and the next article to be transferred is article *a*, then the arm to be used in picking up said article will be extended to the left as shown at A in said intermediate position. At this time air is being admitted under pressure from pipe 35 through valve 39 to pipe 29 and thence through pipe 27 to cylinder 19 and passage 26. Thus piston 18 is being propelled to the left in Figure 1, causing gear 14 and sprocket 12 to rotate and thus impart motion in a counterclockwise direction to sprocket 7 and the sweep or arm 6.

Up to this time the ratchet disk 49 and sprocket 50 have been held frictionally against rotation with the sweep or arm 6 so that chain 59 has maintained the arms A and C in horizontal positions.

When the sweep or arm 6 reaches the intermediate position shown in Figure 1 the pawl 76 drops into notch 73 adjacent thereto and further movement of the sweep or arm 6 thus causes forcible rotation of the ratchet disk and the sprocket 50 with the sweep or arm 6. Hence as there will now be no relative movement between the sprocket 50 and the sweep or arm 6, and thus no relative movement between the head 60 and the sweep or arm 6, the movement of the sweep through the remaining 90° from its intermediate position to its loading position Y will result in a ¼ rotation of the transfer head sufficient to bring arm A into downwardly extended position as shown at Y. The fingers 71 will be spread apart so that they can clear the article *a* to be removed as pressure is maintained during this time inside head 60 against pistons 64 through pipe 27 and passages 26, 57, 56, and 55. As soon as the parts arrive at this position the valve 39 is moved by any suitable means not shown, thereby placing pipe 35 in communication with pipe 32 and pipe 29 in communication with exhaust 37. Consequently all of the pistons 64 will be simultaneously relieved from pressure and their springs 65 will move the pistons inwardly and cause them to pull through rods 66 upon the bell cranks 69, thereby causing fingers 71 of all of the sets to swing toward each other while the fork 72 of the lower set at A will, during this action, embrace the narrow portion *n* of the article *a*. Simultaneously with this closing action of the carrying fork the air admitted to port 33 will start piston 18 in the opposite direction and thus cause the rack 15 to move gear 14 and sprocket 12 in a clockwise direction as seen in Fig. 1.

This will produce a corresponding clockwise movement of the sweep 6 but as the friction disk 48 is pressed firmly against the ratchet disk 49, sprocket 50 will be held stationary. Therefore as the sweep moves in a clockwise direction the arms B and D which have now been brought into horizontal positions will be maintained horizontal while the arms A and C will be maintained vertical until the sweep reaches delivery position X at which time the conveyed article *a* will be deposited on the conveyor II. As the sweep thus moves toward delivery position X the pawl 76 slides back onto the guard finger 75.

As soon as the sweep reaches position X and the conveyed article is in position to be released by the fingers 72, valve 39 is again tripped so as to move back to its former position, this being done automatically by any suitable means provided for that purpose. When the valve is thus shifted it will be positioned as shown in full lines in Figure 1 and air under pressure will thus be directed once more into all of the cylinders 63 so as to cause their pistons to move outwardly and spread apart the forks of the pairs. Consequently the article will thus be freed from the transfer mechanism.

Simultaneously with the release of the delivered article the air will start the piston 18 to the left in Figure 1 and while the transfer head is being maintained against rotation, it will be carried from position X to the intermediate position shown by full lines. Thereafter another arm, B, will be brought into active position and by that time the article *b* to be engaged thereby will have been brought to delivery position. Thus the operation already described will be repeated and as the transfer mechanism is moved back and forth the mechanism thereof will be adapted automatically to the articles of different heights as they are successively presented thereto. After the four finished articles of different heights have been presented and transferred, another group of four articles of different heights is presented. Thus where a glass forming machine is equipped with four finishing molds, it can be used for simultaneously handling four different jobs each comprising a container of a height differing from the others.

While the mechanism is particularly designed for use in transferring four different sizes of articles, it can be readily adjusted to transfer two different kinds only, this being done by the simple process of removing the guard finger 75 so that when the sweep is brought to delivery position X the pawl will drop into the notch 73 normally guarded by finger 75. Consequently when the sweep moves to loading position Y the transfer head will be given a ½ rotation instead of a ¼ rotation and two opposed sets of carrying forks only will thus be used during the transfer operations while the remaining two will not be utilized.

While I have illustrated and described a structure constructed in accordance with my invention and adapted to transfer either two or four differently shaped articles in sequence, it will be obvious from the foregoing that any desired number of arms might be provided on the head 60 and a corresponding number of notches provided on the ratchet 49. I do not wish to be limited, therefore, to a transfer device provided with any specific number of arms or to other details of the particular device here illustrated and described, but only by the scope of the appended claims, which are to be construed as broadly as the state of the prior art permits.

What is claimed is:

1. Transfer mechanism for glassware including a member mounted for oscillation between a loading point and a point of delivery, a transfer head rotatably mounted on said member, and means controlled by the oscillation of said member for imparting to the head a step by step rotation in one direction relative to the member.

2. Transfer mechanism for glassware including a member mounted for oscillation between a loading point and a point of delivery, a transfer head rotatably mounted on said member, separate article carrying tongs on the head, and means controlled by the oscillation of said member for imparting to the head a step by step rotation in one direction relative to the member to bring the tongs to article engaging position successively during successive movements respectively of said member in one direction.

3. Transfer mechanism for glassware including a member mounted for oscillation between a loading point and a point of delivery, a transfer head rotatably mounted on said member, separate article carrying tongs on the head, means controlled by the oscillation of said member for imparting to the head a step by step rotation in one direction relative to the member to bring the tongs to article engaging position successively during successive movements respectively of said member in one direction, means for opening all of the tongs when at the point of delivery and maintaining them open while moving with the member to the loading point, and means for automatically closing all of the tongs at the loading point and maintaining them closed while moving toward the point of delivery.

4. Transfer mechanism for glassware and the like including a member mounted for oscillation between a loading point and a point of delivery, a transfer head rotatably mounted on said member, a plurality of tongs carried by the head, and means controlled by the oscillation of the member for imparting to the head a step by step rotation in one direction relative to the member, thereby to bring the tongs successively to article engaging position upon the completion of the respective movements of the member.

5. Transfer mechanism for glassware and the like including a member mounted for oscillation between a loading point and a point of delivery, a cruciform head rotatably mounted on the member and having tubular arms, tongs adjustably connected to each of the arms, and means operated by the movement of the member in one direction for imparting a partial rotation to the head during such movement thereby to move one of the tongs into article engaging position while approaching the loading point.

6. Transfer mechanism for glassware or the like including a stationary axle, a member mounted for oscillation thereon between a loading point and a point of delivery, a head rotatably mounted on the member, a plurality of article engaging tongs extended radially from the head along intersecting lines, operatively connected means joined to the head and to the axle for holding the head against rotation during the movement of the member from the loading point to the point of delivery, and cooperating means on said member and the operatively connected means for imparting a partial rotation to the head during a portion of the movement of the member toward the loading point.

7. Transfer mechanism for glassware or the like including a stationary axle, a member mounted for oscillation thereon between a loading point and a point of delivery, a head rotatably mounted on the member, a plurality of article engaging tongs extended radially from the head along intersecting lines, a sprocket connected to the head, a sprocket frictionally held to the axle, an endless chain connection between the sprockets, said sprockets and chain being proportioned to hold the head against rotation during the movement of the member in one direction, and cooperating means carried by one of the sprockets and the member for rotating the sprockets during a portion of the movement of the member toward the loading point, thereby to partly rotate the head.

8. Transfer mechanism for glassware or the like including a stationary axle, a member mounted for oscillation thereon between a loading point and a point of delivery, a head rotatably mounted on the member, a plurality of article engaging tongs extended radially from the head along intersecting lines, a sprocket connected to the head, a sprocket frictionally held to the axle, an endless chain connection between the sprockets, said sprockets and chain being proportioned to hold the head against rotation during the movement of the member in one direction, and cooperating means carried by one of the sprockets and the member for rotating the sprockets intermittently in one direction during successive movements of the member in one direction, thereby to impart a partial rotation to the head every time that it approaches the loading point.

9. Mechanism for successively transferring articles of different heights from a loading point to a delivery point, said mechanism including a member mounted for oscillation between said points, a head mounted for rotation on the member, separate article engaging tongs supported radially of the head along intersecting lines, pistons connected to the respective tongs, means for directing air under pressure against all of the pistons to hold all of the tongs open while moving with the member from the delivery point to the loading point, said means being shiftable to release air pressure from the pistons when at the loading point, and means for automatically shifting the pistons to close all of the tongs simultaneously while at the loading point and to maintain them closed while moving with the member to the delivery point.

10. Mechanism for successively transferring articles of different heights from a loading point to a delivery point, said mechanism including a member mounted for oscillation between said points, a head mounted for rotation on the member, separate article engaging tongs supported radially of the head along intersecting lines, pistons connected to the respective tongs, means for directing air under pressure against all of the pistons to hold all of the tongs open while moving with the member from the delivery point to the loading point, said means being shiftable to release air pressure from the pistons when at the loading point, means for automatically shifting the pistons to close all of the tongs simultaneously while at the loading point and to maintain them closed while moving with the member to the delivery point, and means controlled by the movement of said member for successively advancing the tongs to article engaging position during successive movements of the member toward the loading point.

11. Mechanism for successively transferring articles of different heights from a loading point to a delivery point, said mechanism including a member mounted for oscillation between said points, a head mounted for rotation on the member, separate article engaging tongs supported radially of the head along intersecting lines, pistons connected to the respective tongs, means for directing air under pressure against all of the pistons to hold all of the tongs open while moving with the member from the delivery point to the loading point, said means being shiftable to release air pressure from the pistons when at the loading point, means for automatically shifting the pistons to close all of the tongs simultaneously while at the loading point and to maintain them closed while moving with the member to the delivery point, means controlled by the movement of said member for successively advancing the tongs to article engaging position during successive movements of the member toward the loading point, and means for holding the head and tongs against rotation during the movement thereof from the loading point to the delivery point.

12. Mechanism for successively transferring articles of different heights from a loading point to a delivery point, said mechanism including a member mounted for oscillation between said points, a head mounted for rotation on the member, separate article engaging tongs supported radially of the head along intersecting lines, pistons connected to the respective tongs, means for directing air under pressure against all of the pistons to hold all of the tongs open while moving with the member from the delivery point to the loading point, said means being shiftable to release air pressure from the pistons when at the loading point, means for automatically shifting the pistons to close all of the tongs simultaneously while at the loading point and to maintain them closed while moving with the member to the delivery point, means controlled by the movement of said member for successively advancing the tongs to article engaging position during successive movements of the member toward the loading point, the last named means including a sprocket rotatable with the head, a second sprocket, chains connecting the sprockets, said sprockets being of the same diameter, a ratchet disk connected to said second sprocket, and a pawl carried by the member for intermittently engaging the ratchet disk.

13. Mechanism for successively transferring articles of different heights from a loading point to a delivery point, said mechanism including a member mounted for oscillation between said points, a head mounted for rotation on the member, separate article engaging tongs supported radially of the head along intersecting lines, pistons connected to the respective tongs, means for directing air under pressure against all of the pistons to hold all of the tongs open while moving with the member from the delivery point to the loading point, said means being shiftable to release air pressure from the pistons when at the loading point, means for automatically shifting the pistons to close all of the tongs simultaneously while at the loading point and to maintain them closed while moving with the member to the delivery point, means including a sprocket controlled by the movement of said member for successively advancing the tongs to article engaging position during successive movements of the member toward the loading point, and means for holding the head and tongs against rotation during the movement thereof from the loading point to the delivery point, the last named means including a spring secured to and movable with the transfer head, a second sprocket, a chain connecting the sprockets, said sprockets being of the same diameter, the second sprocket and member being movable about a common axis, a disk connected to the second sprocket, and means engaging said disk to hold it frictionally against movement with the member unless forcibly actuated.

14. Transfer mechanism of the class described including a member mounted for oscillation toward and from a loading point, a head rotatably mounted on said member, the axes of the head and member being parallel, a plurality of sets of tongs mounted radially on the head and extended along intersecting lines, and means for imparting an intermittent rotation to the head during the movement of the member toward the loading point to successively advance the tongs to article engaging position at the loading point.

15. Transfer mechanism of the class described including a member mounted for oscillation toward and from a loading point, a head rotatably mounted on said member, the axes of the head and member being parallel, a plurality of sets of tongs mounted radially on the head and extended along intersecting lines, means for imparting an intermittent rotation to the head during the movement of the member toward the loading point to successively advance the tongs to article engaging position at the loading point, and friction means for holding the said head and its tong advancing means against rotation during the movement of the member from the loading point.

16. The combination with a conveyor for holding articles of different heights in predetermined succession and conveying them to a loading point, of a transfer mechanism including a member mounted for oscillation toward and from said loading point, a transfer head on said member mounted for rotation about an axis parallel with the axis of movement of said member, a plurality of sets of tongs carried by the head at different distances from its axis of rotation, and means for advancing the tongs successively while approaching the loading point during successive movements of the member, for successively picking up the articles advanced to the point of loading by the conveyor.

17. In a transfer mechanism a member mounted for oscillation, a transfer head carried thereby and rotatable about an axis parallel with the axis of movement of the member, said head including a plurality of radially disposed tubular arms, cylinders adjustably mounted within the respective arms, a spring pressed piston within each cylinder, opposed pivoted members carried by each cylinder and forming article engaging tongs, a connection between said members and the piston adjacent thereto whereby the members are held normally closed in article engaging position, and means for directing fluid under pressure into the head for distribution to all of the pistons to simultaneously open the tongs against the action of the springs.

18. Transfer mechanism for glassware and the like including a member mounted for oscillation between a loading point and a point of delivery, a head rotatably mounted on the member and having tubular members, tongs adjustably connected to each of the members, and means operated by the movement of the oscillating member in one direction for imparting a partial rotation to the head during such movement thereby to move one of the tongs into article engaging position while approaching the loading point.

19. Article transferring mechanism, comprising a member mounted for movement between loading and delivery points, a plurality of tongs mounted on said member and movable bodily thereby for successively engaging articles at the loading point and moving them to the delivery point, means for opening and closing said tongs, and means for causing relative movement between said tongs and said member constructed and arranged to present said tongs successively at the loading point for transferring articles in sequential order from the loading point to the delivery point.

20. Article transferring mechanism, comprising a member mounted for movement between loading and delivery points, a plurality of tongs mounted on said member and movable bodily thereby for successively engaging articles at the loading point and moving them to the delivery point, means for individually adjusting each of said tongs to accommodate articles of different size, means for opening and closing said tongs to cause them to grasp articles at the loading point and to release such articles at the delivery point, and means effective during the return or idle movement of said tongs and said member from the delivery point to the loading point for causing relative movement between said tongs and said member and so constructed and arranged as to present said tongs successively at the loading point for transferring different sized articles in sequential order from the loading point to the delivery point.

21. Article transferring mechanism, comprising a member mounted for movement between loading and delivery points, a plurality of tongs mounted on said member and movable bodily thereby for successively engaging articles at the loading point and moving them to the delivery point, means associated with said tongs to maintain each article in a predetermined relation to the transfer mechanism during its transfer, and means for causing relative movement between said tongs and said member constructed and arranged to present said tongs successively at the loading point for transferring articles in sequential order from the loading point to the delivery point.

22. Article transferring mechanism, comprising a member mounted for movement in a substantially vertical plane between loading and delivery points, a plurality of tongs mounted on said member and movable bodily thereby for successively engaging articles at the loading point and moving them to the delivery point, means associated with said tongs to maintain the longitudinal axis of each article substantially vertical during the transfer thereof, and means for causing relative movement between said tongs and said member constructed and arranged to present said tongs successively at the loading point for transferring articles in sequential order from the loading point to the delivery point.

23. Article transferring mechanism, comprising a member mounted for oscillation about a relatively stationary axis between a loading point and a delivery point, a head movably mounted on said member, a plurality of article engaging tongs mounted on said head, means operatively connected to said head for maintaining it against rotation during movement of an article carried in one of said tongs from the loading point to the delivery point, and other means operatively connected with the last named means for moving said head during the return or idle movement of said member to present another one of said tongs at the loading point for engaging the next succeeding article at such point.

24. Article transfer mechanism, comprising a relatively stationary support, a member pivoted thereto and arranged for oscillation between a loading point and a delivery point, a head rotatably mounted on said member at a point spaced from the pivotal axis between said member and said support, a plurality of tongs carried by said head and arranged for use successively and sequentially in transferring articles from the loading point to the delivery point, parallel motion means operatively connecting said head and said support, and other means operative only during the idle movement of said member from the delivery point back toward the loading point for indexing said head through a predetermined angle to present different ones of said tongs in position to engage succeeding articles.

JOHN K. E. DIFFENDERFFER.